United States Patent [19]
Hillman et al.

[11] Patent Number: 6,140,956
[45] Date of Patent: *Oct. 31, 2000

[54] VEHICLE TRACKING AND SECURITY SYSTEM INCORPORATING SIMULTANEOUS VOICE AND DATA COMMUNICATION

[75] Inventors: Robert L. Hillman, Laguna Hills; Barry L. Dorr, Carlsbad, both of Calif.

[73] Assignee: Cellutrac, Inc., Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/882,188

[22] Filed: Jun. 25, 1997

[51] Int. Cl.[7] .............................. G01S 5/02; H04B 7/185
[52] U.S. Cl. .............................. 342/357.07; 342/357.06; 342/357.05; 342/457; 701/213
[58] Field of Search ..................................... 342/357, 457, 342/450; 701/213; 455/12.1

[56] References Cited

U.S. PATENT DOCUMENTS

| | | |
|---|---|---|
| 4,651,157 | 3/1987 | Gray et al. . |
| 4,754,255 | 6/1988 | Sanders et al. . |
| 4,941,155 | 7/1990 | Chuang et al. . |
| 5,043,736 | 8/1991 | Darnell et al. . |
| 5,081,667 | 1/1992 | Drori et al. . |
| 5,119,504 | 6/1992 | Durboraw, III . |
| 5,212,831 | 5/1993 | Chuang et al. . |
| 5,223,844 | 6/1993 | Mansell et al. . |
| 5,235,633 | 8/1993 | Dennison et al. . |
| 5,333,175 | 7/1994 | Ariyavisitakul et al. . |
| 5,334,974 | 8/1994 | Simms et al. . |
| 5,363,375 | 11/1994 | Chuang et al. . |
| 5,363,376 | 11/1994 | Chuang et al. . |
| 5,388,147 | 2/1995 | Grimes . |
| 5,389,934 | 2/1995 | Kass . |
| 5,410,541 | 4/1995 | Hotto . |
| 5,418,537 | 5/1995 | Bird . |
| 5,479,482 | 12/1995 | Grimes . |
| 5,504,491 | 4/1996 | Chapman . |
| 5,515,043 | 5/1996 | Berard et al. . |
| 5,555,286 | 9/1996 | Tendler . |
| 5,557,254 | 9/1996 | Johnson et al. . |
| 5,559,520 | 9/1996 | Barzegar et al. . |
| 5,572,204 | 11/1996 | Timm et al. . |
| 5,576,716 | 11/1996 | Sadler . |
| 5,587,715 | 12/1996 | Lewis . |
| 5,712,899 | 1/1998 | Pace, II . |
| B1 5,043,736 | 9/1994 | Darnell et al. . |

FOREIGN PATENT DOCUMENTS

| | | |
|---|---|---|
| WO 96/18275 | 8/1995 | U.S. . |
| 0 501 058 A2 | 6/1991 | United Kingdom . |
| 0 580 397 A2 | 7/1993 | United Kingdom . |
| WO8912835 | 12/1989 | WIPO . |

OTHER PUBLICATIONS

Burst Coherent Detection With Robust Frequency and Timing Estimation for Portable Radio Communications, Chuang, et al. (1988).

Performance of Autonomous Dynamic Channel Assignment and Power Control for TDMA/FDMA Wireless Access, Chuang, et al., *IEEE Journal on Selected Areas in Communication*, vol. 12, No. 8 (Nov. 1994).

Performance of a TDM/TDMA Portable Radio Link for Interference, Noise and Delay Spread Impairments, Afrashteh, et al., *IEEE Transactions on Vehicular Technology*, vol. 43, No. 1 (Feb. 1994).

(List continued on next page.)

*Primary Examiner*—Thomas H. Tarcza
*Assistant Examiner*—Dao L. Phan
*Attorney, Agent, or Firm*—Knobbe, Martens, Olson & Bear, LLP

[57] ABSTRACT

A system which tracks and monitors a vehicle by utilizing cellular communication componentry and global positioning system componentry is disclosed. The system provides for simultaneous and continuous transmission of a voice signal and location data to a monitoring center. The monitoring center comprises componentry to communicate with the vehicle and determine the vehicle's location on a digitized map using a computer.

16 Claims, 11 Drawing Sheets

OTHER PUBLICATIONS

Burst Coherent Demodulation with Combined Symbol Timing, Frequency Offset Estimation, and Diversity Selection, mChuang, et al., *IEEE Transactions on Communications,* vol. 39, No. 7 (Jul. 1991).

Low–Overhead Symbol Timing and Carrier Recovery for TDMA Portable Radio Systems, Sollenberger, et al., *IEEE Transactions on Communication,* vol. 38, No. 10 (Oct. 1990).

GPS–Based Vessel Position Monitoring and Display System, Reynolds, et al., *IEEE Transactions on Communication,* (1990).

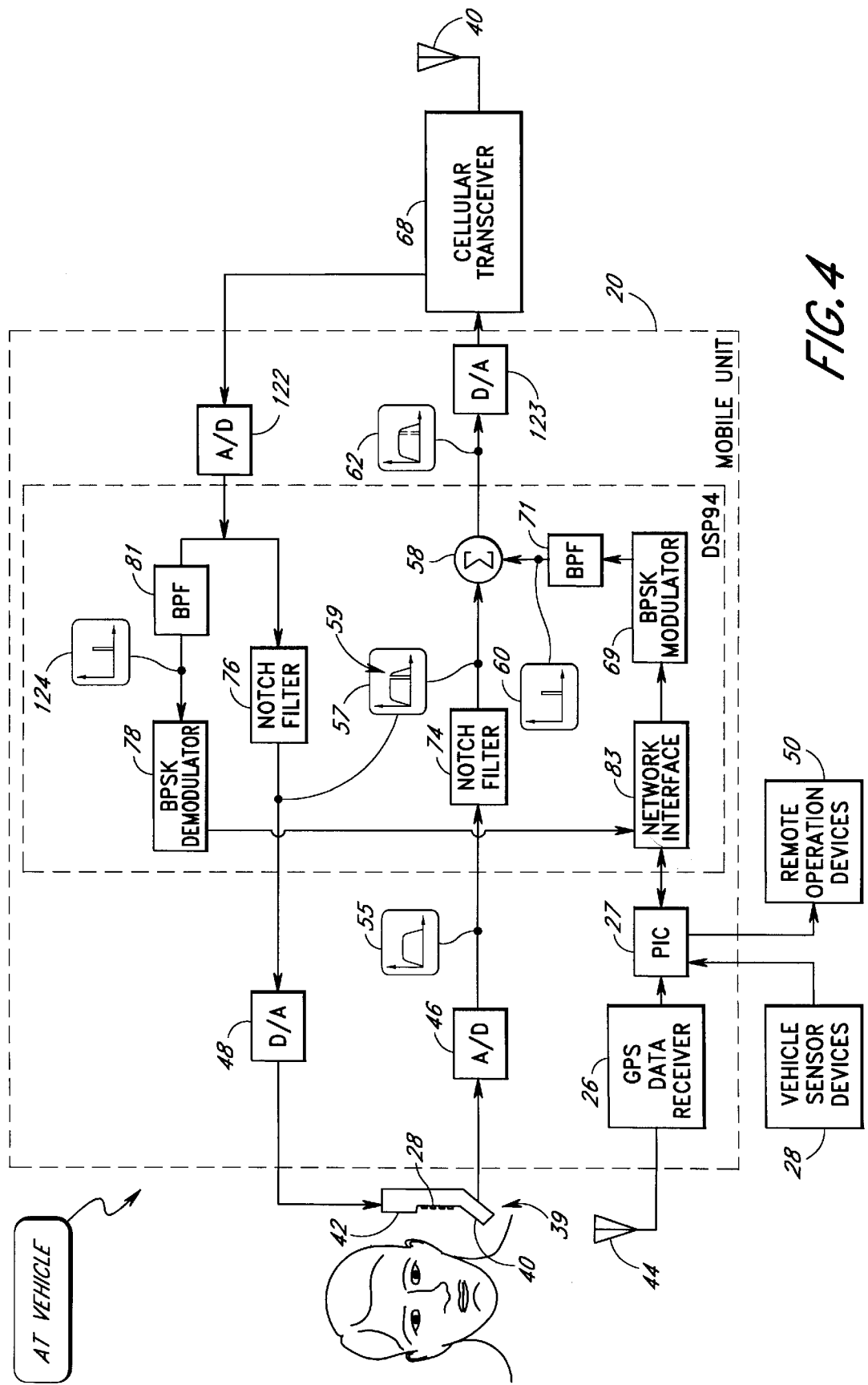

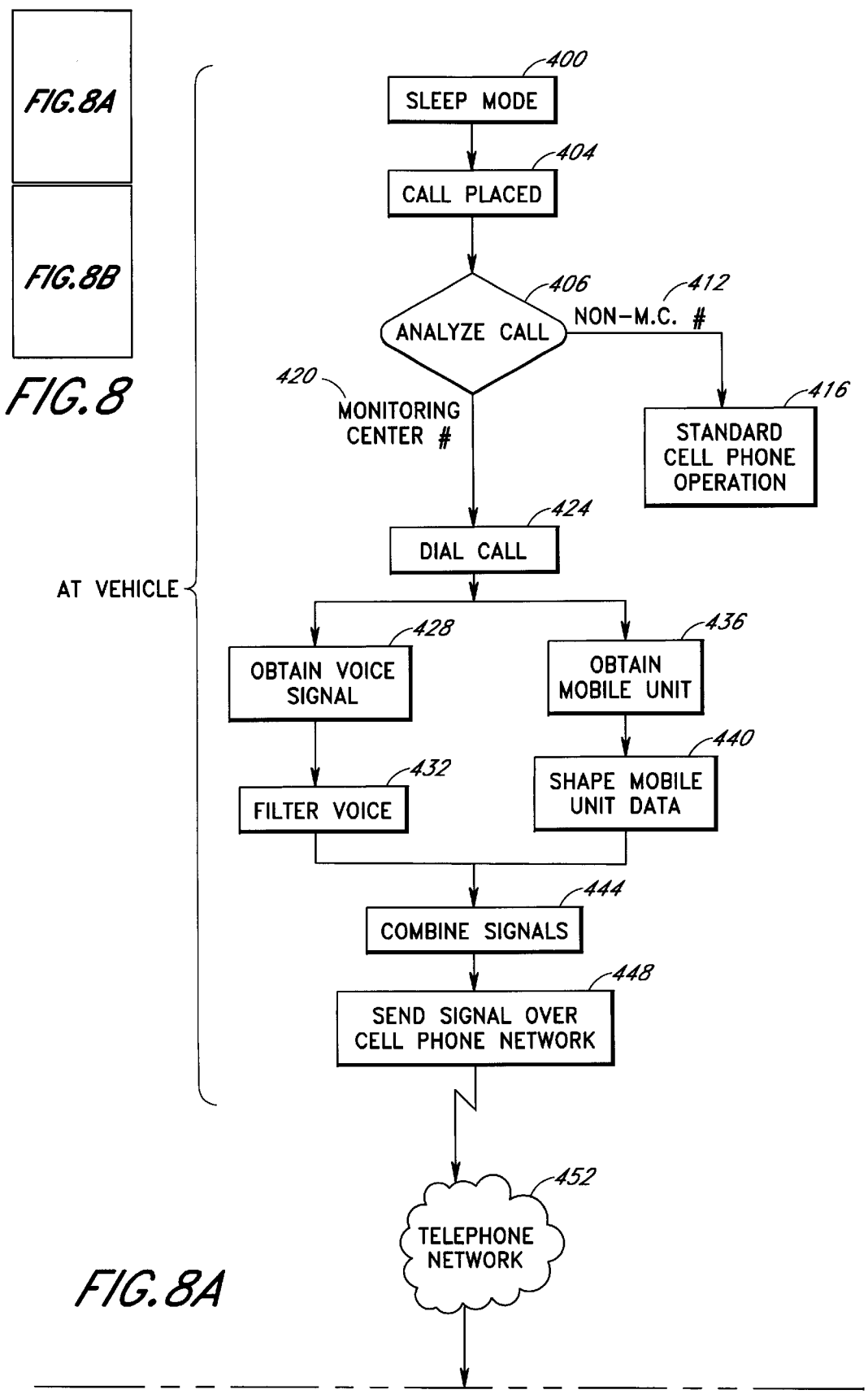

VEHICLE TRACKING AND SECURITY SYSTEM INCORPORATING SIMULTANEOUS VOICE AND DATA COMMUNICATION

FIELD OF THE INVENTION

The present invention relates to a vehicle communication, tracking and security system which utilizes a communication link over a cellular network to simultaneously transmit both voice and GPS vehicle location data.

BACKGROUND OF THE INVENTION

Since the early part of this century, the automobile has become a major part of the culture both in the U.S. and throughout the world. The independence, freedom, and rapid travel that automobiles provide, however, has also resulted in an individual becoming lost, involved in accidents, and becoming victims of crime. By way of specific example of the latter, when an individual traveling in a vehicle experiences mechanical failure, they encounter a potentially dangerous situation because of the high crime rate in an area or unfortunate random acts of violence which occur upon the freeway and road systems. Likewise, vehicle theft is an ever increasing problem with vehicles being stolen for personal use or parts. A new criminal trend has recently emerged known as carjacking wherein a vehicle is physically taken while being operated.

The prior art includes a number of systems which allow a vehicle's occupant to obtain assistance if such assistance is needed, or to track the vehicle in the event of theft. See, e.g. U.S. Pat. No. 5,043,736 to Darnell, et al., U.S. Pat. No. 5,223,844 to Mansell, et al., U.S. Pat. No. 5,557,254 to Johnson, et al. These systems all share the same basic concept, that is, placing global positioning system (hereinafter GPS) in a vehicle to transmit the received GPS signals from the vehicle to a monitoring center over a cellular telephone link or pager system network. These systems are comprised of various components. Some have a GPS receiver located in the vehicle. The GPS receiver obtains GPS signals from satellites in orbit around the earth and, upon obtaining these signals, uses signal processing techniques to determine the GPS receiver's location. Also located in the vehicle is a communication device to transmit the GPS signal from the vehicle. These communication devices include cellular transmission systems, pager systems or radios. Finally, a base center or monitoring center receives the GPS signal from the vehicle, and processes the information to determine the position of the vehicle. However, each of these prior art systems has significant drawbacks relating to both the manner in which they provide verbal communication between the operator of the vehicle and the monitoring center and the manner in which the GPS data is transmitted between the automobile and the monitoring center.

SUMMARY OF THE INVENTION

The present invention provides a significantly improved system which integrates the communication capabilities of a cellular telephone system with the geographic locating capabilities of Global Positioning Systems (GPS). The two technologies are mated in a vehicle tracking and communication system providing for simultaneous transmission of voice and data such that an operator of a vehicle may maintain continual voice communication with a monitoring center with the GPS processor and/or vehicle sensors simultaneously transmitting data to the monitoring center.

In particular, the invention comprises a single system which, for ease of explanation is discussed in two separate segments. The two segments communicate over a cellular telephone link. The first segment of the invention is in a vehicle. The first segment includes a mobile unit, cellular telephone componentry and optional vehicle sensors and optional remote operation devices.

The mobile unit contains a GPS receiver that continually obtains information from GPS satellites in orbit around the earth. These satellites transmit information which, when received and processed, provides the geographic location of the unit receiving the signals. Based on this information, a vehicle's position is determined.

In addition to GPS location data, the vehicle's sensor devices provide data to the communication device. The vehicle sensors monitor the vehicle for various occurrences such as break-in, theft, towing, accident, excessive distance traveled, user controlled speed violations, geographic boundary violations or conversation monitoring. Data indicating the occurrence of an event combines with the voice signal.

Upon receiving and processing the mobile unit data (GPS location data and/or the sensor device data), a digital signal processor (DSP) combines the mobile unit data with a vehicle occupant's voice signal, if present. If the telephone is not receiving voice data, the mobile unit data is sent alone.

The cellular telephone transmits the combined signal over the cellular telephone network to the second segment of the invention, the monitoring center. During the call to the monitoring center, the GPS receiver continuously provides GPS data to the signal processor for insertion into the outgoing signal.

The monitoring center has a communication device similar to the mobile unit, absent the GPS receiver; a telephone; a computer with tracking software and digitized maps, and a computer display to provide a visual representation of the map and the vehicle's location thereon.

An incoming call undergoes a filtering process by a monitoring center DSP to separate the mobile unit data from the voice portion of the signal. The electronics route the voice portion of the signal to the telephone so that an operator or multiple operators at the monitoring center may converse with the vehicle's occupants. The electronics route the data portions of the signal to the computer. The computer, in conjunction with the software and digitized maps, process the data to display a graphical representation of a map and the vehicle's location thereon. Since the GPS data is continually and simultaneously being sent during the call, the operator at the monitoring center is able to track the movement of the vehicle during the conversation. The computer also displays vehicle sensor data.

In addition to verbal communication, in one embodiment of the invention, the monitoring center actually controls the vehicle's remote operation devices with the computer. For example, the monitoring center can automatically stop operation of the vehicle's engine, honk the horn, turn the lights on, or start the car to charge the battery. The monitoring center's DSP filters and combines the voice of the monitoring center operator with data information from the computer. The monitoring center operator is thus able to provide directions or other information to the vehicle's operator or occupants, and control the remote operation devices.

Advantageously, the claimed invention overcomes drawbacks of prior vehicle tracking and communication systems by incorporating in one communication signal simultaneous transmission of voice and data. The system simultaneously transmits voice and data by filtering out a narrow notch of the voice signal centered at 2500 Hz. The digital signal processor then shapes the mobile unit data to fit within the notch at 2500 Hz in the voice signal. The two signals combine to create the single signal sent out over the cellular telephone network. The combined signal generally mirrors the original voice signal. This features makes the present invention compatible with any cellular, radio, microwave, or telephone system. This is a significant advantage over systems of the prior art which require special telephone system configurations to operate.

Upon reception by a receiving unit, the signal is again filtered to separate the data information from the voice information. The voice information, although missing a small amount of voice information at 2500 Hz, does not noticeably suffer from signal degradation because the amount of data removed from the voice signal is insignificant. Further, the 2500 Hz frequency at which this notch occurs is chosen to minimize degradation of the voice signal's quality.

Further enhancing the operation of the present invention is continual transmission of GPS location data. Continual transmission of the GPS location data to the monitoring station allows a technician at the monitoring station to continually track on a digitized map the movement, in real time, of the vehicle. Continual transmission of the GPS location data is achieved, in part, because of the novel method of packaging the GPS location data sent over the telephone network.

Advantageously, the present invention arranges the data signal differently then most modem communication configurations. Generally, communication by modem incorporates introductory preamble and synchronization information to synchronize the relationally larger amounts of data passing between the sending and receiving devices. However, in the present invention, small but continual bursts of GPS data are sent. The communication device of the present invention disposes with the preamble and the synchronization information and instead begins by sending packets or payloads of mobile unit data. After receiving a packet, the signal processor synchronizes and demodulates the information. This method reduces the time and bandwidth requirements for sending small payloads of information and thereby improves the quality of the received voice signal.

The present invention also overcomes the complications resulting from echo introduced by telephone service providers. The echo is undesirable when sending voice and data simultaneously, as in the present invention. The present invention overcomes this hurdle through the use of an interrupt detector in the mobile unit and the monitoring station. The interrupt detector synchronizes data transmission to briefly cease transmission from the mobile unit if the monitoring station needs to send a brief activation signal to the vehicle's remote operation devices. This feature overcomes the disruption of data caused by telephone system echo.

Another important advantage is that it provides a monitor on the unattended automobile without requiring a substantially disabling draw on the automobile battery. As described below, the preferred embodiment includes a "sleep" mode with a negligible current drain. Periodically, the system is momentarily "wakened" to determine if any intervention activity has occurred so that an alarm message is automatically sent from the vehicle to the monitoring center.

Further objects, features, and advantages of the present invention over the prior art will become apparent from the detailed description which follows, when considered with the attached figures.

BRIEF DESCRIPTION OF THE DRAWINGS

FIG. 4 is a basic flow diagram of the signal processing in the mobile unit of the present invention.

FIGS. 8A and 8B are a flowchart illustrating the operation of the present invention.

DETAILED DESCRIPTION OF THE PREFERRED EMBODIMENT

Figure 1:
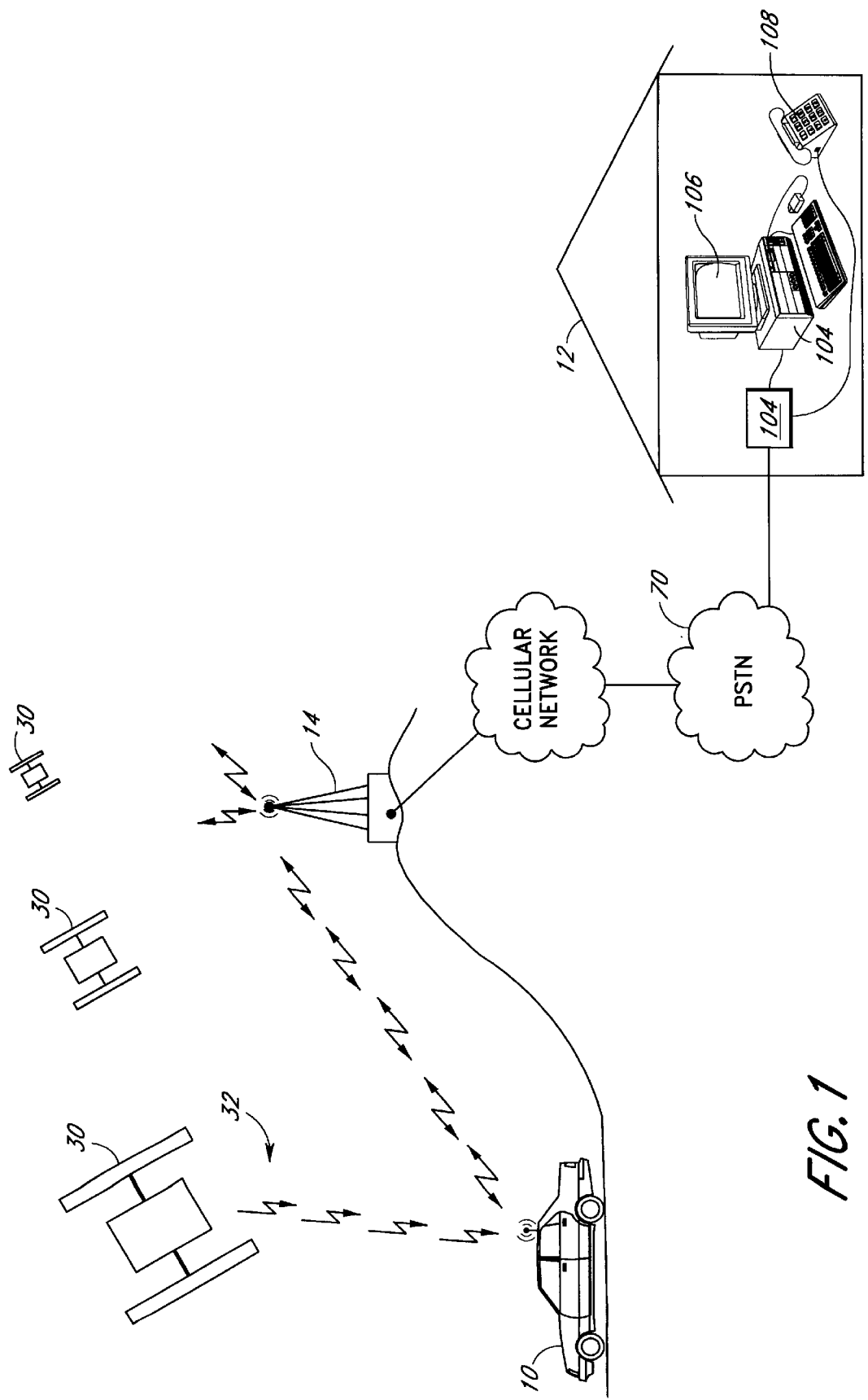
FIG. 1 is a broad overview of the system of the present invention.

FIG. 1 illustrates a broad overview of the system of the present invention. The system of the present invention simultaneously transmits voice and GPS location data from a vehicle 10, to a cellular site 14, and eventually, via land based telephone lines 70, to a monitoring center 12. The location data is obtained from signals 32 sent from a constellation of Global Positioning System (GPS) satellites 30.

For ease of explanation, the present invention is discussed in two segments. The first segment comprises the componentry contained on the vehicle 10. The second segment comprises the componentry contained at the monitoring station 12.

The Mobile Unit

Figure 2:
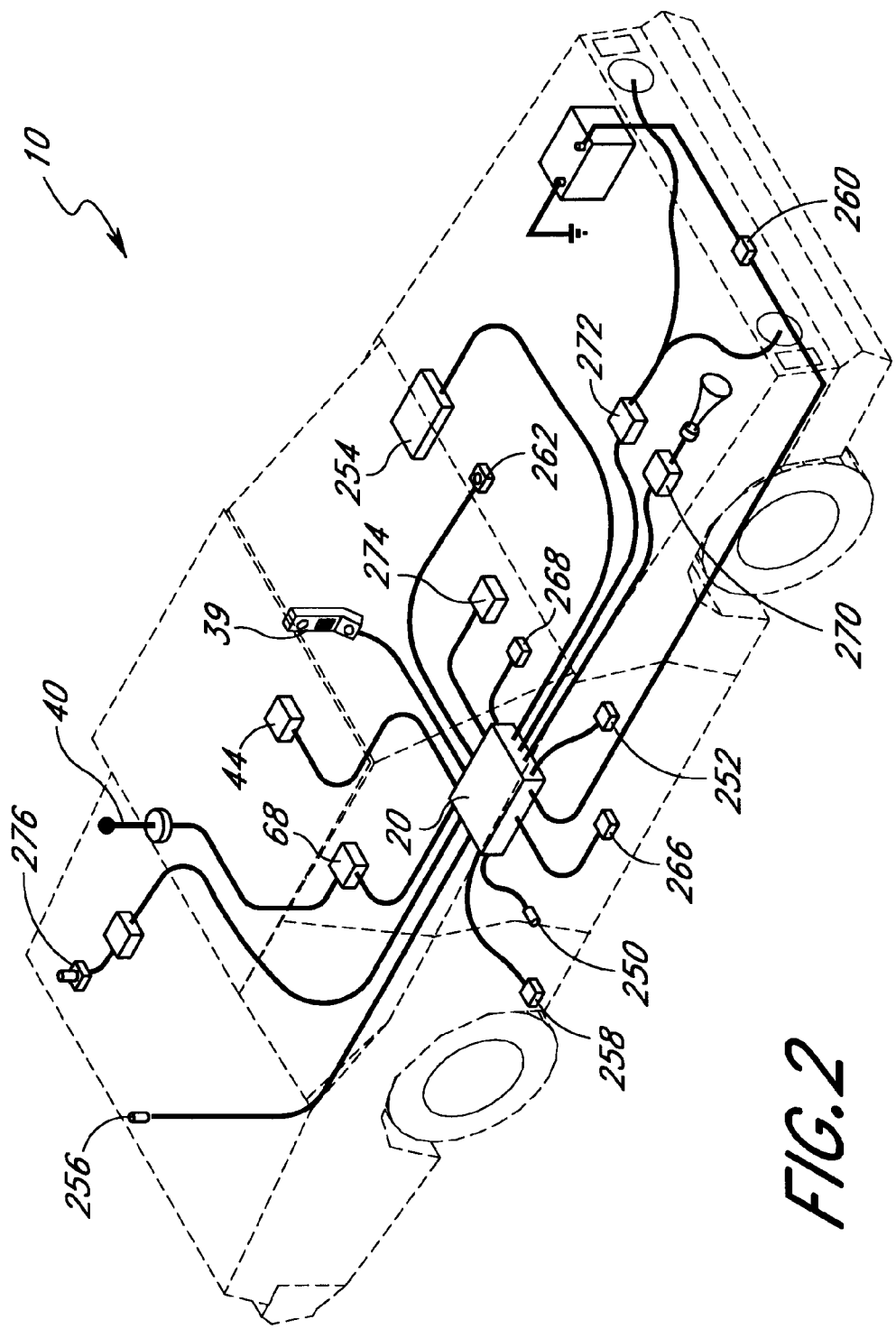
FIG. 2 illustrates a vehicle incorporating various vehicle sensors and remote operation devices.

FIG. 2 illustrates the first segment of the present invention comprising componentry contained in the vehicle 10. A mobile unit 20 serves as a central processor for receiving inputs from various vehicle sensors and providing outputs to various remote operation devices. The basic connections to the mobile unit 20 include a standard cellular telephone handset 39, a standard cellular telephone mobile transceiver 68, and a GPS antenna 44. A cellular telephone antenna 40 is connected to cellular transceiver 68.

FIG. 2 also shows additional features of the present invention that include a number of embodiments in which various vehicle sensors connect to, and send messages to, the mobile unit 20 without inhibiting voice communication. Referring to FIG. 2, embodiments of the invention can include any or all of the following sensors: an open door sensor 250; an engine running sensor 252; a speed/distance sensor 254; a trunk open sensor 256; a motion/tilt sensor 258; a battery charge sensor 260; and a silent assistance request sensor 262. These devices provide information to the mobile unit 20 which processes and transmits the vehicle sensor data to the monitoring center 12.

FIG. 2 further shows additional features of the present invention that include embodiments for providing for a number of remote operation devices connecting to the mobile unit 20. The remote operation devices interact with various vehicle componentry to provide for control of certain vehicle functions by remote signals from the monitoring center 12. Possible remote operation devices include: a door unlock device 266; an engine ignition device 268; a horn energization device 270; a head lamp energization device 272; an engine kill device 274; and an open trunk device 276.

Connecting to the mobile unit 20 are the general components of a cellular telephone. The cellular telephone componentry separates into three general sections; the handset 39, the cellular transceiver 68 comprising a cellular processor, transmitting and receiving circuitry, and the automobile cellular antenna 40. In addition to or alternatively, a push button (not shown) connects to the mobile unit 20 to provide fast, hidden and simple means to establish an emergency communication link with the monitoring center 12. Alternatively, the cellular handset may be built into the automobile 10.

Figure 3:
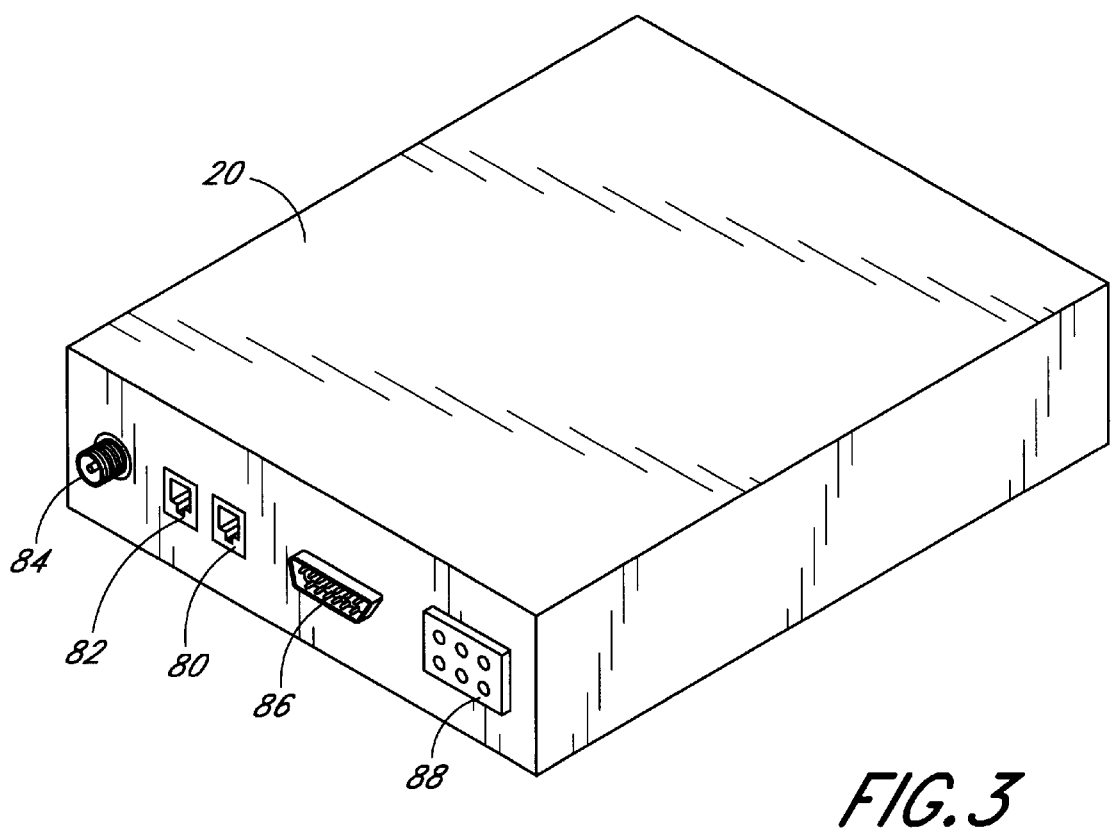
FIG. 3 is a perspective view of the outside of the mobile unit of the present invention.

FIG. 3 illustrates a basic set of connectors provided by the mobile unit 20. The mobile unit 20 includes a handset jack 80, and a transceiver jack 82. The cellular handset 39 connects to the handset jack 80. The cellular transceiver 68 connects to a jack 82. The GPS antenna 44 connects to an antenna port 84 while vehicle sensors and remote operation devices connect to the mobile unit 20 via a program control port 86. A power input connector 88 connects to 12 V DC from the vehicle battery. One skilled in the art will recognize that other connections to the mobile unit could be provided without departing from the spirit and scope of the present invention.

FIG. 4 illustrates the internal signal processing provided by the mobile unit 20. The mobile unit 20 includes a GPS receiver 26 which is connected through the antenna port 84 (FIG. 3) to the GPS antenna 44. The mobile unit 20 also contains a Digital Signal Processor (DSP) 94 comprising a network interface function block 83, a Bandpass Filter (BPF) 71, a Binary Phase Shift Keying (BPSK) modulator 69, an adder 58, a notch filter 74, a notch filter 76, a bandpass filter 81 and a BPSK demodulator 78.

An output of the GPS receiver 26 is connected to an input of a PIC microprocessor 27. Various external vehicle sensors and devices 28, and various remote operation devices 50 are also connected to the PIC processor 27 through the program control port (network interface) 86. A serial I/O port on the PIC processor 27 is connected to a serial I/O port on the network interface 83. An output of the network interface 83 is connected, through the BPSK modulator 69, to the input of a bandpass filter 71. An output of the band pass filter 71 is connected to a first input of the adder device 58.

A microphone 40 in the handset 39 is connected through the handset jack 80 (FIG. 3) to an input of a microphone analog-to-digital (A/D) converter 46. An output of the microphone A/D 46 is connected, through the notch filter 74, to a second input of the adder 58. An output of the adder 58 is connected to an input of the transceiver digital-to-analog (D/A) converter 123. An output of the transceiver D/A is connected to an analog input of the cellular transceiver 68. An analog output of the cellular transceiver 68 is connected to an input of a transceiver A/D 122. An output of the transceiver A/D 122 is connected to an input of the bandpass filter 81 and to an input of the notch filter 76. An output of the notch filter 76 is connected to an input of a speaker D/A 48 and an output of the speaker D/A is connected to a speaker 42 in the handset 39.

An output of the bandpass filter 81 is connected to an input of the BPSK demodulator 78 and an output of the BPSK demodulator is connected to an input of the network interface 83.

Figure 5A:
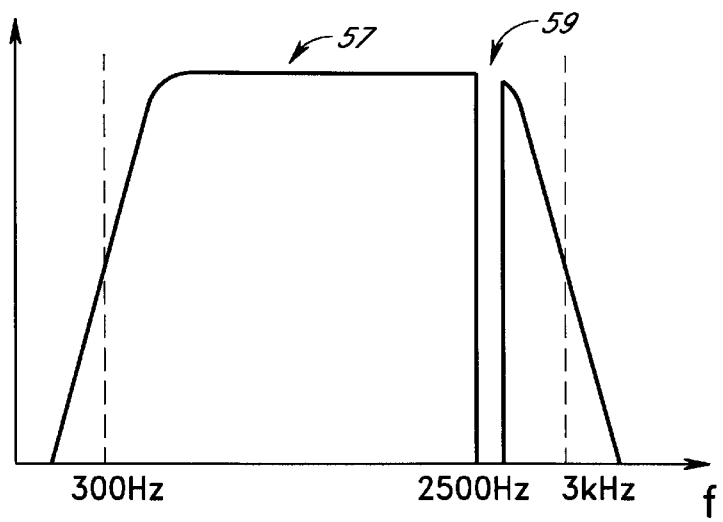
FIG. 5A is a graph illustrating the voice signal after filtering.
Figure 5B:
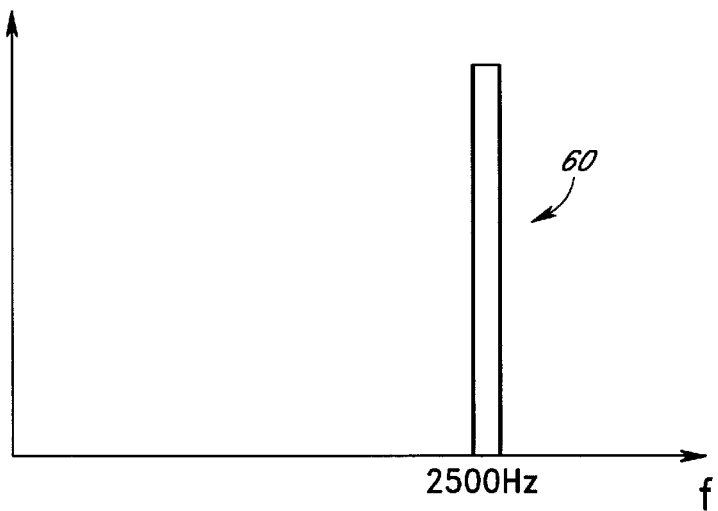
FIG. 5B is a graph illustrating the mobile unit data or the data to the remote operation devices.
Figure 5C:
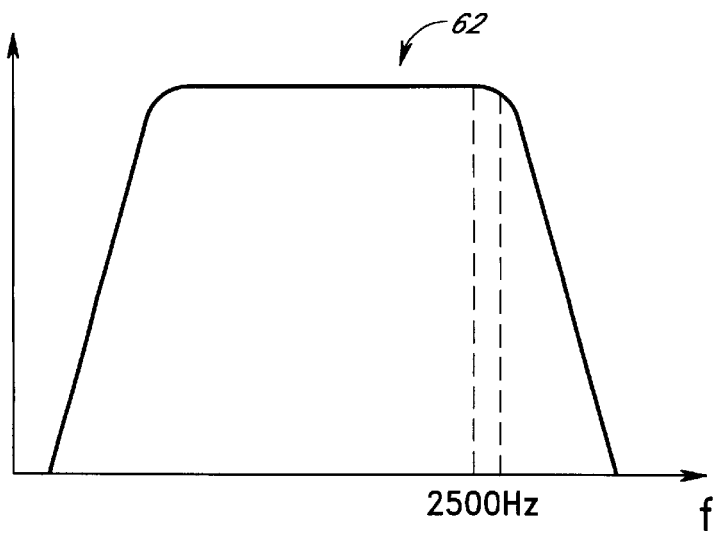
FIG. 5C is a graph illustrating the combined signal which comprises the filtered voice signal and the vehicle sensor data and/or the remote operation device data.

FIG. 4 also shows spectral waveforms for various signals found in the mobile unit 20. Waveform 55 shows a spectrum of the voice signal at the input of the notch filter 74. Waveform 57 shows a spectrum (shown enlarged in FIG. 5A) at the output of the notch filters 94 and 76. The waveform 57 shows a band limited spectrum having a lower cutoff frequency of roughly 300 Hz, and an upper cutoff frequency of roughly 3000 Hz. The waveform 57 also shows a narrow spectral notch, approximately 200 Hz wide, at 2500 Hz. Waveform 60 shows a spectrum (shown enlarged in FIG. 5B) at an the output of the BPSK modulator 69. The waveform 60 is a narrow spectral line centered at 2500 Hz and having a bandwidth of approximately 200 Hz. Waveform 62 shows a spectrum (shown enlarged in FIG. 5C) at the output of the adder 58, waveform 62 being the sum of the waveforms 57 and 60. Finally, waveform 124 shows a spectrum at an output of the bandpass filter 81. This waveform 124 is substantially identical to the waveform 57.

In addition, as described below, an automatic answering device, an automatic dialing device, and other electrical componentry used in a system of this nature are advantageously included in the mobile unit 20.

Satellites 30 (shown in FIG. 1) provide signals 32 from which the position of the mobile unit 20 is very accurately determined. Most commonly the systems are known as GPS receivers and processors. The present invention can effectively utilize the GPS system in wide usage, however, in the future, other data location signals may be available and usable with this invention. The GPS receiver 26 receives the signals 32 from satellites 30. Automatic answering devices (not shown) can be incorporated to automatically answer calls coming from the monitoring center 12. The auto answering device, in conjunction with the remote operation devices, provide for remote operation of certain vehicle functions by the monitoring center 12. Automatic answering devices are known by those with skill in the art and accordingly are not described herein.

An automatic dialing device (not shown) enables the mobile unit 20 to automatically call the monitoring center 12 or other entity, such as the vehicle owner, upon the occurrence of an event detected by the vehicle sensors. Automatic dialing devices are known by those with skill in the art and accordingly are not described herein.

The DSP 94 processes the voice and data signals. The DSP 94 both combines the two into a voice+data signal for transmission to the monitoring station 12, and separates the combined voice+data signals received from the monitoring station into separate voice and data signals as follows: The output of the microphone D/A converter 46 is a sampled digital version of the analog voice signal produced by the microphone 40. As shown in the waveform 55, the spectrum of the voice signal is a bandpass signal having a lower cutoff frequency of approximately 300 Hz, and an upper cutoff frequency of approximately 3000 Hz. The notch filter 74 removes a small portion of the voice spectrum. In a preferred embodiment, the notch filter 74 is a 12 pole Butterworth filter which notches out a 200 Hz wide band with a center frequency of 2500 Hz. Removal of such a small portion of the spectrum at 2500 Hz has been found to produce virtually no audible effects. The use of a Butterworth alignment minimizes group delay and thus further reduces any audible effects introduced by the filter. In a specific embodiment of this invention, this notch filter 74 is implemented in the DSP 94 as a transversal filter, with 6 bi-quadratic sections, and having a total of 320 taps.

The network interface 83 receives, from the PIC processor 27, a serial data stream containing GPS location data as well as data from the vehicle sensor devices 28. The network interface provides data buffering and network data link and channel access services. Data link functions include packetizing the data, generating error codes, error correction, etc. As described below, in a preferred embodiment, the network architecture of the present invention is designed such that the mobile unit 20 and the monitoring center 12 do not transmit data simultaneously. The network interface 83 determines which unit can transmit at any given time.

In a specific embodiment of this invention, the output of the network interface 83 is a serial data stream at 100 Bits Per Second (BPS). The 100 BPS data is fed to the BPSK modulator 69 which modulates the signal using binary phase shift keying (BPSK), onto a 2500 Hz carrier. The output of the BPSK 69 is fed into the into a filter 71 which limits the total bandwidth of the data stream to 200 Hz. The BPSK modulator 69 comprises a modulator and Nyquist filter having an alpha factor of 1, such that the output of the BPSK modulator 69 is a signal centered at 2500 Hz with total bandwidth of 200 Hz. Thus, the spectrum of the output of the BPSK modulator 69 covers the same frequencies that were removed from the voice signal by the notch filter 74. The adder 58 combines the output of the notch filter 74 and the BPSK modulator 69 to produce a combined voice+data signal. The combined voice+data signal from the adder 58 is converted from digital to analog format by the transceiver D/A converter 123.

The output of the D/A 123 connects, via the telephone port 82 (FIG. 3), to a cellular transceiver 68. The transceiver 68 prepares and sends the combined voice and data signal 62 via the cellular antenna 40. Currently available cellular telephone componentry advantageously is used to transmit this combined voice and data signal. Other communication devices may be used to transmit the combined signal 62 via radio signal. As shown in FIG. 1, the combined signal 62 travels to a cellular site 14 and subsequently connects to the land-based telephone connection 70 which feeds the signals to the monitoring center 12.

The system thus transmits the combined signal 62 over the standard cellular radio and land based telephone systems to the monitoring station 12. Advantageously, the combined voice+data signal 62 appear to the standard cellular telephone systems as a voice only signal. This eliminates incompatibility of a signal of the system of the present invention with standard telephone/cellular networks.

For signals transmitted from the monitoring station 12 to the mobile unit 20, a combined voice+data analog signal is sent from the monitoring center 12 using the land-based Public Switched Telephone Network (PSTN) system to the cellular site 14 where it is transmitted to the vehicle 10 and ultimately received by the vehicle's transceiver 68. The received analog voice+data signal from the transceiver 68 is converted to a digital format by the transceiver A/D 122 and sent to the DSP 94. In the DSP 94, the combined digital voice+data signal is fed to two separate signal paths, a voice signal path comprising the notch filter 76, and a data signal path comprising the bandpass filter 81 and the BPSK demodulator 78.

The notch filter 76 has the same transfer function as the notch filter 74. Thus, the notch filter 76 removes a 200 Hz portion of the combined spectrum centered at 2500 Hz. The removed portion corresponds to the data portion of the combined voice+data signal, leaving only the voice portion of the signal. The digital output of the notch filter 76 is converted to an analog signal by the speaker D/A 48 and subsequently sent to the speaker 42 in the handset 39.

The bandpass filter 81, has a center frequency of 2500 Hz, and a bandwidth of 200 Hz. This corresponds to the spectrum of the data portion of the combined voice+data signal. Thus the bandpass filter 81 blocks the voice portions of the combined signal and outputs only the data portions. The monitoring center modulates the data in the same fashion as the mobile unit 20, namely, a 100 BPS, BPSK format. The output of the bandpass filter is fed into the BPSK demodulator 78 where the data is demodulated such that the output of the BPSK demodulator 78 is a baseband 100 BPS data stream. In the specific embodiment, the BPSK demodulator 78 uses a Costas loop for carrier recovery and a constant slope detector for bit recovery. The demodulated data is sent by the network interface 83 to the PIC processor 27.

The preferred embodiment of the invention described herein includes a modem that uses BPSK to modulate a data stream into a 200 Hz wide frequency band centered at 2500 Hz. One skilled in the art will recognize that bands other than a 200 Hz band centered at 2500 Hz could be used without departing from the spirit and scope of the present invention. One skilled in the art will also recognize that modulation methods other than BPSK, and filter transfer functions other than 12 pole Butterworth filters could also be used without departing from the spirit and scope of the present invention.

In the embodiment disclosed above, the convertors 46, 48, 122, and 123 are each advantageously relatively inexpensive 8-bit converters operating at a sample rate of 8000 Hz, and the signal output of the BPSK modulator is approximately 6 db higher than the signal output of the notch filter 74. With these 8-bit converters, the signal-to-noise performance requirements of the data signal are achieved so long as the level of the data signal is not substantially smaller than the level of the voice signal. In those applications in which it is advantageous to reduce the level of the data signal significantly, an alternative embodiment for convertors 46, 48, 122, and 123 utilizes 10-bit convertors. The output of the BPSK modulator 69 can then be much lower (−20 db or more) than the output of the notch filter 74.

Figure 6:
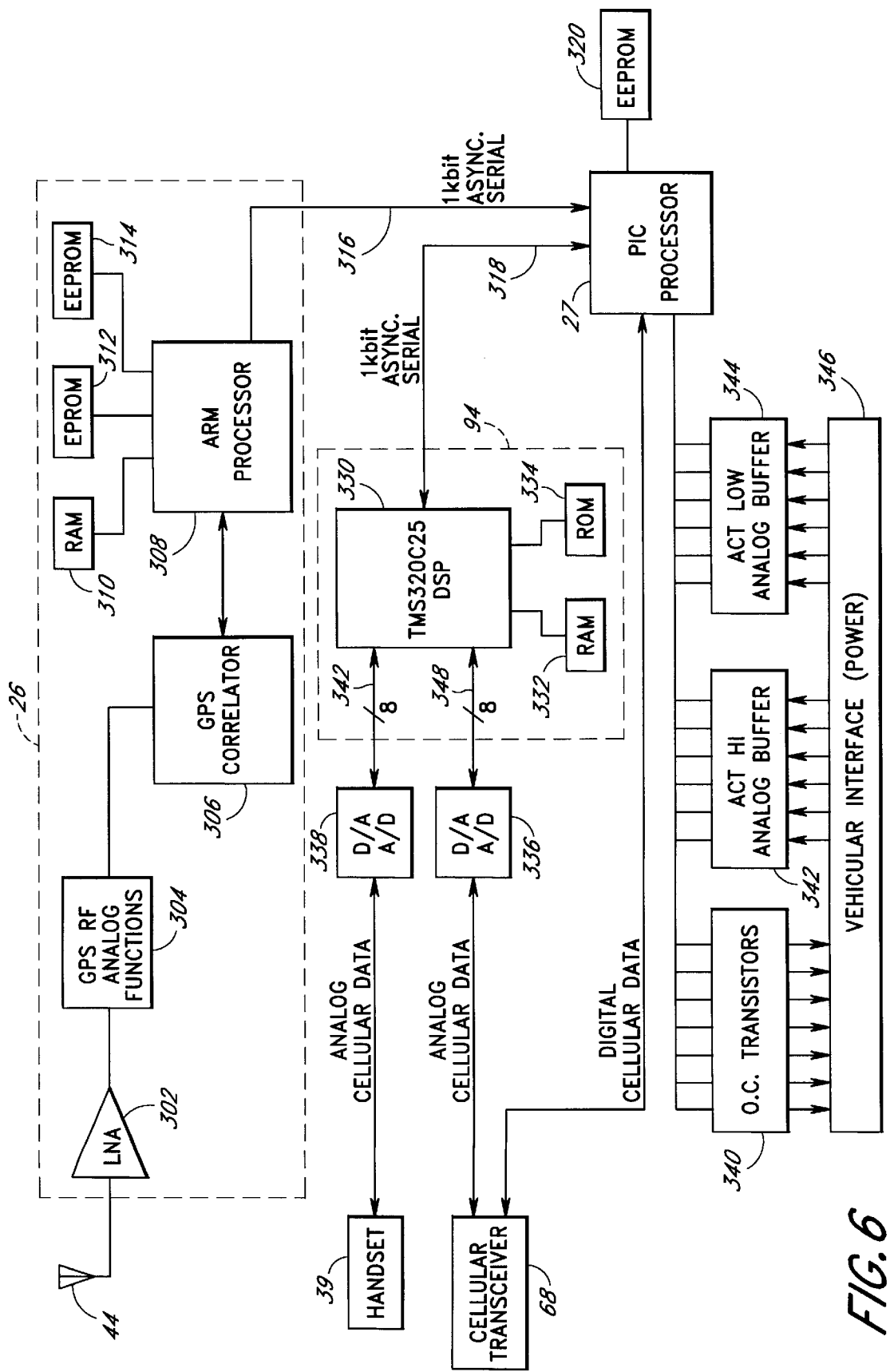
FIG. 6 is a hardware block diagram that illustrates the basic layout of the internal componentry of the mobile unit.

FIG. 6 is a hardware block diagram of the mobile unit 20 showing details of the GPS receiver 26, the DSP 94, and the PIC processor 27. The GPS receiver 26 comprises a low noise amplifier (LNA) 302, an analog RF block 304, a correlator block 306, and an ARM processor 308. The GPS antenna 44 is connected through the antenna port 84 (FIG. 3) to an input of the LNA 302. An output of the LNA 302 is connected to an input of the analog RF block 304, and an output of the analog RF block 304 is connected to an input of the correlator 306. The correlator 306 is connected by a data bus to the ARM processor 308. Also connected to the ARM processor 308 are a random access memory (RAM) 310, an electrically programmable read only memory (EPROM) 312, and an erasable electrically programmable read only memory (EEPROM) 314. The ARM processor 308 sends data over a 1 kbit/second a synchronous serial link 316 to the PIC processor 27.

The PIC processor 27 is connected to an EEPROM 320, and it is connected to the cellular transceiver 68 by a bi-directional a synchronous bus. The a digital output bus of the PIC processor 27 is connected to a external output buffer 340 comprising open collector transistors. The output buffer 340 connects to a vehicular interface 346. Also connected to the vehicular interface 346 are an act hi analog buffer 342 and an act low analog buffer 344. The buffers 342 and 344 are connected to an input bus of the PIC processor 27.

The DSP 94 comprises a DSP processor 330 connected to a RAM 332 and a ROM 334. A 1 kbit a synchronous serial I/O port on the DSP processor 330 is connected to a similar port on the PIC processor 27 by a serial link 318. The DSP processor 330 is connected to an A/D–D/A compounding coder/decoder (codec) 338 and an A/D–D/A compounding codec 336. The codec 338 contains the microphone A/D 46 and the speaker D/A 48, the codec 336 contains the transceiver A/D 122 and the transceiver D/A 123.

In the preferred embodiment, the GPS receiver is based on a 12 channel NTI/Commico GyPSy-12 receiver designed by Navigation Technology International. In the NTI receiver, the analog RF block 340 is a GEC Plessey GP2010 triple-conversion syperheterodyne receiver having an IF output at 4.309 MHz, the correlator 304 is a GP2021, and the ARM processor 308 is an ARM60 manufactured by Advanced Risk Machines. Also in the preferred embodiment, the DSP processor is a Texas Instrument's TMS320C25.

A significant advantage of this preferred embodiment is that it is ideally configured to minimize power consumption. The mobile unit 20 monitors the vehicle sensors and responds to incoming calls using power from the battery. To further minimize power consumption the mobile unit provides for a sleep mode (shown at block 400 of the flow chart of FIG. 7) in which except for a minimal amount of power supplied to the ARM EPROM 312 (to maintain the most current GPS position data) and the PIC processor 27 (to run the sleep timer), the system shuts down thereby using approximately only 25 milliamps of power at 9 to 16 volts. At predetermined times, in this preferred embodiment 3 to 4 times per hour, determined by a timer in the PIC processor 27, the system exits sleep mode and "wakes up" to compare current GPS signals with the stored location data in the EPROM 312. If the location has changed the system can signal an alarm to the monitoring center 12. If the monitoring center 12 needs to contact the mobile unit 20 while the mobile unit is in sleep mode, the monitoring center can call during one of the pre-determined times when the mobile unit is powered up, i.e. awake. Advantageously, this preferred embodiment conserves power for extended periods of time, especially if the duration of the sleep mode is increased, yet allows for contact at pre-determined times by the monitoring center 12.

In this preferred embodiment, the mobile unit uses three microprocessors to speed operation and further reduce sleep mode power consumption. One microprocessor providing the DSP 94 used in conjunction with the transceiver 68. The second microprocessor is the ARM processor 308 included in the location data (GPS) receiver 26. The third microprocessor is the PIC processor 27 which performs the monitoring operations of the sleep mode and controls the power to other devices in the mobile unit 20. The PIC processor 27 is advantageously selected to require a very low input power so that during sleep mode only this microprocessor is operable and consuming power.

The PIC processor 27 provides power management (not shown), vehicle data acquisition using the buffers 340, 342 and 344. The PIC processor 27 also gathers GPS data from the ARM processor 308 over the serial link 316. The ARM processor 308 is the data processing engine for the GPS receiver 26, and it formats and packetizes GPS data for transmission to the monitoring center. The DSP processor 330 provides the signal processing needed to combine and separate the voice and data channels. The DSP processor also provides network functions corresponding to a physical access layer, a data link layer, and a media access layer. The physical access layer corresponds to the actual data modulation/demodulation functions. The data link layer corresponds to error correction and generation of error codes. The media access layer corresponds to the time division multiplexing of the data channel as discussed below in the section relating to echo rejection.

The Monitoring Center

Figure 7:
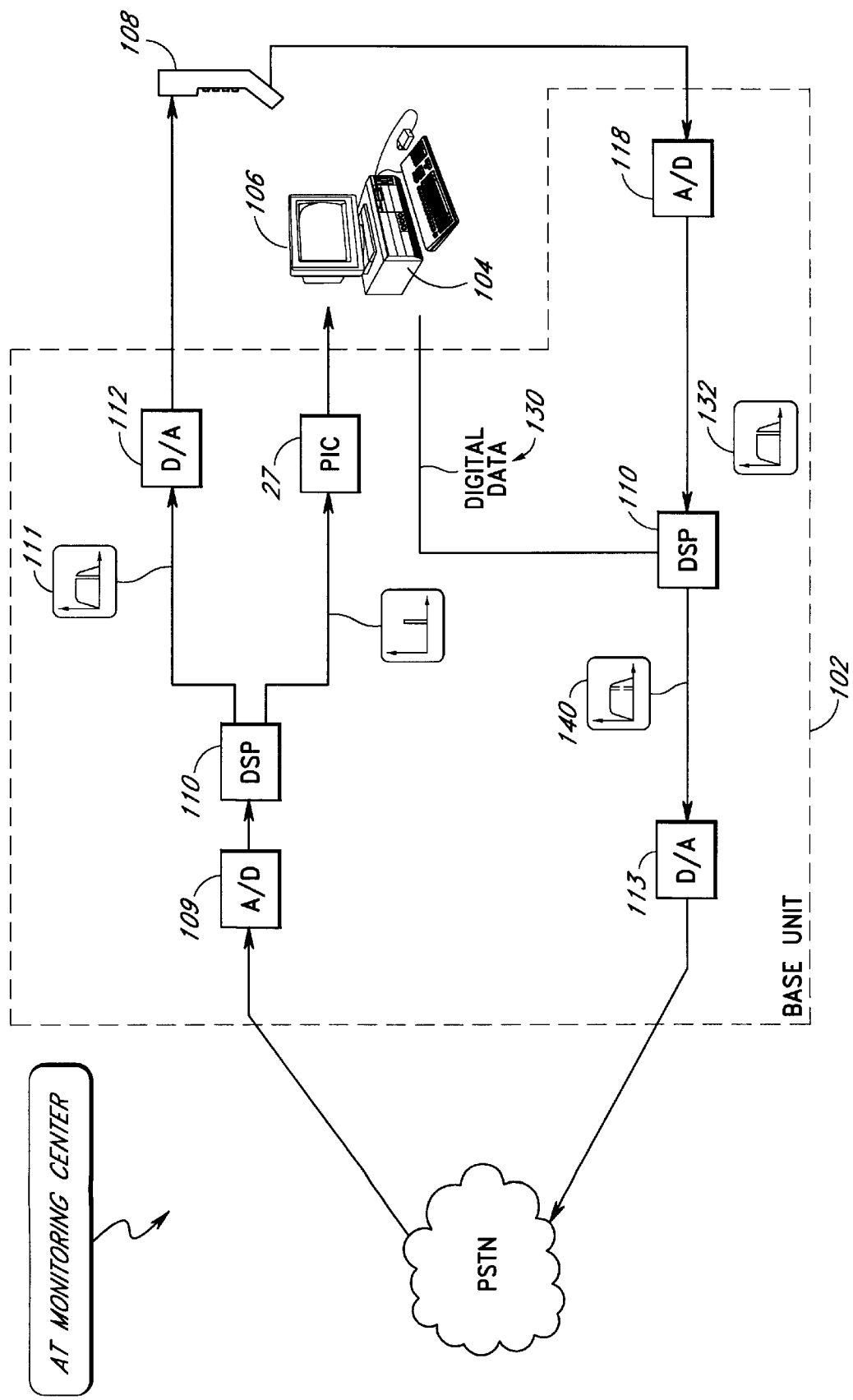
FIG. 7 is a basic flow diagram of the signal processing in the monitoring center.

The second segment of the invention, namely the monitoring center 12, is illustrated in FIG. 7 and includes base unit 102, a computer 104 with display 106, and telephone 108. An automatic answering device (not shown) may also be included. The base unit 102 has a power supply providing electrical current to each of the components. The combined voice and data signal from the vehicle advantageously enters the monitoring center 12 through a multiplexed telephone system capable of handling multiple calls simultaneously. The call connects to the base unit 102 which in turn connects to an analog to digital converter (A/D) 109 which converts the analog signal from the telephone system lines 70 to a digital signal.

The signal processing performed at the monitoring center 12 is substantially similar to that performed in the mobile unit 20. In a preferred embodiment, the same circuit cards, albeit without the GPS receiver components, are used in the monitoring center 12 and in the mobile unit 20. Therefore, most of the discussion above relating to the signal processing in the mobile unit 20, and particularly in the DSP 94, applies to the monitoring center as well.

In the monitoring center, the A/D converter 109 connects to a base unit DSP 110 which performs high order filtering on the signal to separate the combined signal 62 into the voice signal 57 and the mobile unit data signal 60. The monitoring center DSP output connects to a digital to analog converter 112 to transform the voice signal back to the analog domain. The digital to analog converter 112 links to the monitoring center telephone 108 which outputs the reconstructed voice signal to a monitoring center technician. The voice signal 111 received by the monitoring center technician is generally substantially identical to the voice signal 55 sent by the mobile unit 20, i.e., the voice signal less the missing notch of voice information 59.

The base unit DSP 110 connects the mobile unit data signal 60 to a PIC microprocessor 27 before feeding the data to the monitoring center computer 104. The computer 104 advantageously stores a plurality of digitized maps. The computer 104 accepts the input GPS location data from the vehicle 10 and plots the mobile unit's position on the digitized maps shown on the computer display 106.

The computer 104 also advantageously contains digital information regarding the specific vehicle 10 and vehicle operator. The computer 104 enables the monitoring center to control the vehicle's remote operation devices as shown in FIG. 5 and discussed previously. For example, the operator at the monitoring center 12 controls the computer 104 to send a signal 140 to the mobile unit 12. As in the mobile unit 20, the base unit DSP 110 shapes the remote operation device signal to a 200 Hz frequency band, centered at 2500 Hz.

The monitoring center 12 also provides for the monitoring center technician to speak with the occupants of the vehicle 10. The microphone of the monitoring center telephone 108 connects to a base unit analog to digital converter 118, which in turn connects to the base unit DSP 110. The base unit DSP 110 notch filters the voice signal and combines the notched voice signal with any digital data 130 from the computer 104.

The base unit converts the signal to an analog format using a D/A converter 113, and outputs the combined voice and digital data signal 140 to the communication device, which connects and sends the signal onto the telephone network lines 70. The telephone network in turn connects to a cellular site 14 which in turn transmits the signal via radio waves to the antenna 44 of the mobile unit 20.

At the mobile unit 20, the antenna 40 receives the received combined signal to the transceiver 68, which in turn connects to an analog to digital (A/D) converter 122 and then to the mobile unit DSP 94 which separates the signal into voice and monitoring center data 124. The monitoring center data 124 controls the vehicle's remote operations devices, described previously and illustrated in FIG. 6.

The processed voice signal 126 from the mobile unit DSP 94 connects to a digital to analog converter 48. The digital to analog converter 48 connects to a mobile unit speaker 42 which allows the operator of the vehicle 10 containing the mobile unit 20 to hear the monitoring center technician.

The system of the preferred embodiment may also advantageously serve multiple vehicles 10 simultaneously by providing multiple telephone lines into the monitoring center 12. As each subsequent call from a mobile unit 20 enters the monitoring center, telecommunications equipment routes the call to a base unit 102 that is waiting to receive a call. The scope of operation is greatly increase my adding and adjusting the number of mobile units 20 and base units 102. The present invention may be embodied to cover and create a nationwide or worldwide operation range, serving mobile units around the world.

System Operation

Figure 8B:
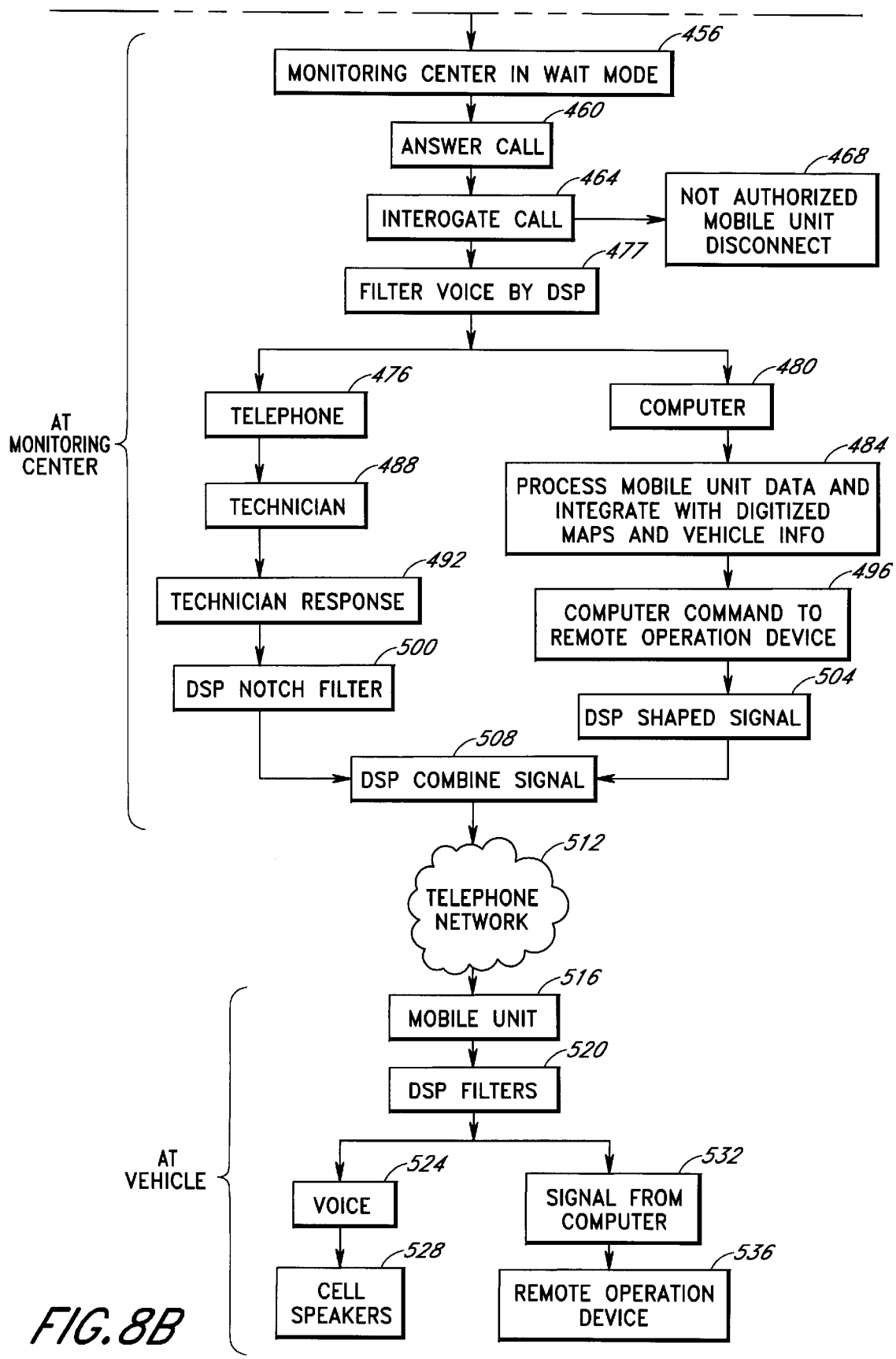

FIGS. 8A and 8B provide a flow chart of the operation of the system of the present invention. These figures are described with further references to FIGS. 4 and 7. Block 400 shows the system in the sleep mode in which only a single low power microprocessor is operating. An operator of a vehicle 10 equipped with a mobile unit 20 needing to contact the monitoring center 12 enters the telephone number of the monitoring center in the keypad 28 as shown in block 404. Alternatively the vehicle occupant may actuate the monitoring center direct dial button (not shown) to automatically dial the monitoring center. At block 406, the mobile unit 20 analyzes the number dialed to determine if the call is to the monitoring center 12. If the call is not to the monitoring center 12, the standard cellular communication device 68 places the call and the system performs as a standard cellular telephone as shown in block 412, 416. During a call of this nature, i.e. not to the monitoring center 12 the mobile unit 20 does not process the voice signal and it is transmitted without manipulation by the DSP 94.

If the call is to the monitoring center 12 or if the direct dial button is actuated 420 the call to the monitoring center is dialed as shown at block 424.

Meanwhile, the monitoring center 12, at block 456, is in wait mode in anticipation of an incoming call. The call from the mobile unit, block 424, connects to the monitoring center, block 460, via an existing telephone network, shown as block 452. At block 464 an interrogation process occurs to determine if the call is from an authorized mobile unit 20. As shown at block 468, any unauthorized calls are automatically disconnected.

Authorized calls connect to the monitoring center 12, block 472, and are converted from an analog to digital signal before being filtered by the base unit DSP 110, shown at block 472. As described above, the base unit 102 uses signal processing techniques to process the information in the call so that as the operator of the vehicle communicates the problem or reason for calling via the cellular telephone link the GPS data is sent simultaneously with the voice signal. Using this information the technician at the monitoring center 12 locates the mobile unit 20 on a digitized map stored on the monitoring center computer 104.

The system achieves simultaneous transmission of the voice and location data with electronics within the mobile unit 20 and the base unit 102. Referring now to FIGS. 4 and 8, the voice signal enters, at block 428, from the microphone 40 of the cellular handset. The signal is transformed with the analog to digital converter 46 to a digital signal 55.

The voice signal 55 enters the mobile unit DSP 94 wherein the signal is notch filtered to remove a small portion of the signal at 2500 Hz, block 432. The removed notch of voice information 59 is discarded and creates a space for the mobile unit data 60, i.e. location data and/or data from the vehicle sensors.

Concurrent with the DSP's manipulation of the voice signal 55, the DSP 94 at block 436 obtains the mobile unit location data 60 and at block 440 shapes the mobile unit data 60 to fit within the notch 59 in the filtered voice signal 57.

Next at block 444, the DSP 94 combines the notched voice signal 57 with the mobile unit data 60 to obtain a combined voice and data signal 62 that contains essentially all of the original voice signal plus the GPS data.

As described above, the notch 59 in the voice signal 55 occurs at 2500 Hz to eliminate any noticeable degradation of the voice signal. The frequency of 2500 Hz is advantageously chosen because most of the important frequency energy of the voice signal is contained below 1000 Hz. Thus, a loss of a narrow frequency band of information at 2500 Hz provides an insignificant degradation to the voice signal. Furthermore, inserting the mobile unit data at 2500 Hz reduces the introduction of additional harmonics into the cellular signal which could interfere with transmission. Selecting 2500 Hz also avoids the supervisory audio tones, around 6000 Hz, used in the management of cellular communication.

The combined signal 62 arrives at the monitoring center 12 via a standard telephone line 70. The present invention provides for one or more base units 102 at the monitoring center 12. At the monitoring center 12 the telephone signal connects to the base unit 96 where, as discussed previously the call is interrogated to verify it is from an authorized mobile unit, block 464. The base unit 102 automatically disconnects calls from unauthorized sources to prevent system overload 468.

Calls from authorized mobile units 20 enter the base unit 102. The base unit 102 converts the call to a digital signal with an analog to digital converter 109. At block 472 the base unit DSP 110 filters the combined signal 62 to separate the mobile unit data 60 from the voice signal 55. The filtered voice signal 111 is generally identical to the original processed voice signal 55 except for the missing notch 59 of information discarded by the mobile unit 20 to make room for the mobile unit data 60. The voice signal 111 is then converted to an analog format by an digital to analog converter 112 before the signal is electrically transmitted to the monitoring station telephone 108, as shown at block 476.

The GPS and any other data on the received base signal is sent to the computer 104 as shown by block 480. At block 484 the base unit computer 104 receives the mobile unit data 60. The computer 104 displays the information in conjunction with stored information regarding the mobile unit 20, vehicle 10, and vehicle operator. The computer 104 displays a map of the area corresponding to the location of the mobile unit 20 and on the map graphically indicates the vehicle's location. Likewise, any data sent from the vehicle sensors appears on the computer display 106.

At block 492 the technician at the monitoring center 12 can respond to the information from the vehicle 10. For example, the monitoring center 12 can provide directions, dispatch mechanical assistance, a tow truck, police, fire or ambulatory assistance, or assist the vehicle's occupants with other assistance. During the entire process the monitoring center 12 maintains continual verbal contact with the vehicle's occupants and obtains continual location data to monitor the vehicle's location in real time.

As discussed above, embodiments of the system of the present invention allow for vehicle tracking or theft response devices. In operation, the vehicle sensors monitor the various security aspects of the vehicle 10. If a vehicle sensor is triggered, the actuated sensor device energizes the mobile unit 20 thereby enabling the location data receiver 26 of the mobile unit to receive location data. One embodiment includes emergency automatic dialing device (not shown) which calls the monitoring center 12 and sends sensor data, location data, and a help needed signal. Advantageously, a call may also be placed using a silent assistance request sensor 262 comprising a hidden, under the carpet silent switch that when actuated automatically and silently places a call to the monitoring center. A call placed using the silent assistance request sensor 262 is silent and secret to occupants of the vehicle, i.e. carjackers, and provides a special warning to the monitoring center that the call was placed using the silent assistance request sensor.

Upon receiving the automatically dispatched call form the vehicle 10, the monitoring center 12 is made aware of the sensor data and the vehicle's location. The technician at the monitoring center 12 may take various actions. Thus, the technician may silently track the vehicle's movement while secretly listening to conversations within the vehicle. The technician may verbally query the operator of the vehicle 10 for information or to explain the vehicle sensor data. The technician may dispatch police or other appropriate personal to investigate the alarm. The technician may also use the computer 104 to send signals to control the remote operation devices. For example, in conjunction with the police pursuit, the technician can signal the engine kill device 274 to stop the vehicle.

Advantageously, the system of the present invention also provides for the monitoring center 12 initiating a call to the mobile unit 20. In operation, the monitoring center computer 104 calls the cellular number of the mobile unit 20. The automatic answering device of the mobile unit 20 automatically answers the call to form a cellular telephone link between the monitoring center 12 and the mobile unit. Shown in block 496, the technician, using the monitoring center computer 104, may transmit control data to the remote operation devices. Thus, the monitoring center 12 can control the operation of the vehicle 10 by actuating the remote operation devices described previously and illustrated in FIG. 5. The remote operation devices integrate with the vehicle's sensors to monitor and track the vehicle or to cease the operation of the vehicle's propulsion apparatus.

Transmission of the combined voice and data signal to the mobile unit 20 from the monitoring center 12 is achieved in the same fashion as data transmission from the mobile unit to the monitoring center. At blocks 500 and 504 the voice of the technician at the monitoring center 12 enters the mouth piece of the monitoring center telephone 108, where, upon being converted to an electrical voice signal it is converted to a digital signal by an analog to digital converter 118 and processed in accord with the previously described notch filtering method. At block 508 the signal 130 from the computer 104 combines with the telephones voice signal 132 and at block 512 is sent over the telephone network 512. The combined signal arrives at the mobile unit via the land and cellular telephone system.

At block 516 the mobile unit 20 receives the base unit combined signal 140 and directs the incoming signal to an analog to digital filter 122 before connecting to the mobile unit DSP 94, shown at block 520. The DSP 94 separates the signal into the incoming voice signal component at block 524 and the incoming computer generated signal component 124 at block 532. The voice signal undergoes conversion from a digital format to an analog format in the digital to analog converter 48. At block 528 the voice signal is sent to the cellular telephone speaker 42 so that it can be heard. The mobile unit 20 directs the signal from the computer 124 to the remote operation devices 50, shown as block 536, to initiate operation.

Data Packet Synchronization

Figure 9A:
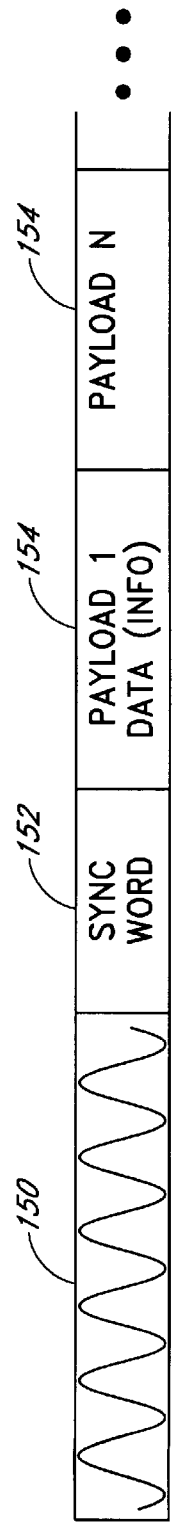
FIG. 9A illustrates the configuration of transmitted data of the prior art.

An advantage, of the present invention is that it overcomes inefficiencies in the method of sending data in the prior art. FIGS. 9A illustrates the arrangement of data transmission in the prior art. When sending data via telephone lines 70 using standard modem technology the first part of the signal comprises a preamble 150. The preamble provides a signal to synchronize communication between two communication devices. Next, a synchronization word 152 readies the modem communication device for the payload data that follows. The payload data 154 is the mobile unit data 60 or the computer generated signal 130 from the monitoring center. In systems of the prior art, the duration of actual data transmission is relationally large compared to the duration of the preamble 150 and the synchronization bit 152.

Figure 9B:
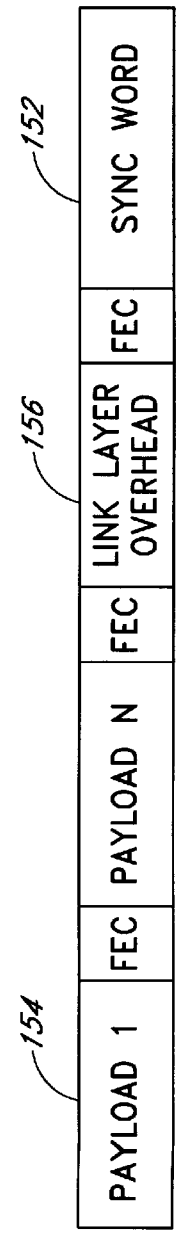
FIG. 9B illustrates the configuration of transmitted data of the present invention.

With the present invention, the duration of payload transmission is relationally short compared to the duration of preamble and synchronization bit transmission. A long preamble is advantageous because of the relatively poor signal to noise ratio provided by the cellular network. Thus, when sending small amounts of information the method of the prior art would typically necessitate allotting a greater percentage of time for sending the preamble 150 and synchronization word 152 than for sending the payload 154. The present invention uses a substantially more efficient method of sending data which is illustrated by FIG. 9B. This preferred embodiment advantageously utilizes reverse time demodulation to obtain a received signal. Advantageously, the invention first transmits several payloads 154 (where each payload includes forward error correction (FEC) bits), followed by a link layer overhead (LLO) field 156 (also including FEC bits) and finally a synchronization word 152. The data in the payloads is randomized using a key contained in the LLO field 152.

The receiving DSP samples the received waveform and stores the samples in a buffer. At some point, usually during the LLO field 156, the DSP has buffered enough samples to allow it to achieve synchronization. The DSP continues to read the input data stream until it has obtained the sync word 152. Once the DSP has obtained the sync word 152, then it can go back and demodulate the LLO field 156 to obtain the information needed to decode the payloads. The DSP then demodulates and decodes the data payloads 154. Demodulation is easily performed between each burst of received data. Once the data payloads are demodulated the data, is de-randomized and corrected for errors using the FEC bits.

Using this method and apparatus, the present invention is able to continually send short bursts of location data and demodulate the same immediately after reception. The DSP is able to demodulate the information in a short time period when compared to the time required to receives the information. Data packets may be of varying length, and the LLO packet may contain a field which specifies the data packet length. However, the data packet should be long enough such that the DSP can achieve synchronization before arrival of the synchronization word 152. In a preferred embodiment, the time from the beginning of the first payload 154 to the synchronization word 152 is typically 1.8 seconds for a GPS position report.

In a preferred embodiment, the FEC bits attached to the payload packets 154 are Reed-Solomon codes, and the FEC bits attached to the LLO packets 156 are goalie codes.

It is theoretically possible, albeit unlikely, that data in a data packet 154, or in the LLO packet 156, could have the same bit pattern as the synchronization word 152. In an alternative embodiment the data in the data payloads 154 is randomized so that even if one data packet is erroneously identified as a synchronization word, the following data packets (which may be randomized differently) will contain different bit patterns and thus not match the synchronization word. The data in the data payloads 154 is randomized before transmission by using a pseudo-random code sequence. The pseudo random code is generated by a pseudo-random number generator from a seed value. The seed value is then sent with the data payloads 154 as a field in the LLO packet 156. In a preferred embodiment, a different seed value is used for each LLO packet 156. After demodulation, the DSP 94 uses the seed to generate a reconstructed pseudo-random code sequence that is identical to the pseudo-random codes sequence originally used to randomize the payloads 154. The reconstructed pseudo-random code sequence is then used to de-randomize the data in the data payloads 154. In a particularly preferred embodiment, the randomization and subsequent de-randomization is accomplished by using an exclusive-or operation to combine the data-payloads 154 with the pseudo-random code sequence.

Sidetone Echo Cancellation

Another important feature of the present invention is that it overcomes the complications resulting from sidetone and echo introduced by telephone service providers. The sidetone is removable, as is the noise since it is un-correlated and statistically stationary, however, the data echo is more difficult to remove. In particular, if both the mobile unit 20 and the base unit 12 transmit data at the same time, the resulting echo interferes with the data exchange process.

The present invention overcomes this problem by using time division multiplexing (TDM) of the data channel. Thus, only one unit either the base or the mobile, is transmitting at any given time. The transmitting unit will not see any echoes because it will not be receiving data during its transmitting period. Likewise, the receiving unit will not see any echoes because it will not be transmitting during its receiving time periods.

Figure 10:
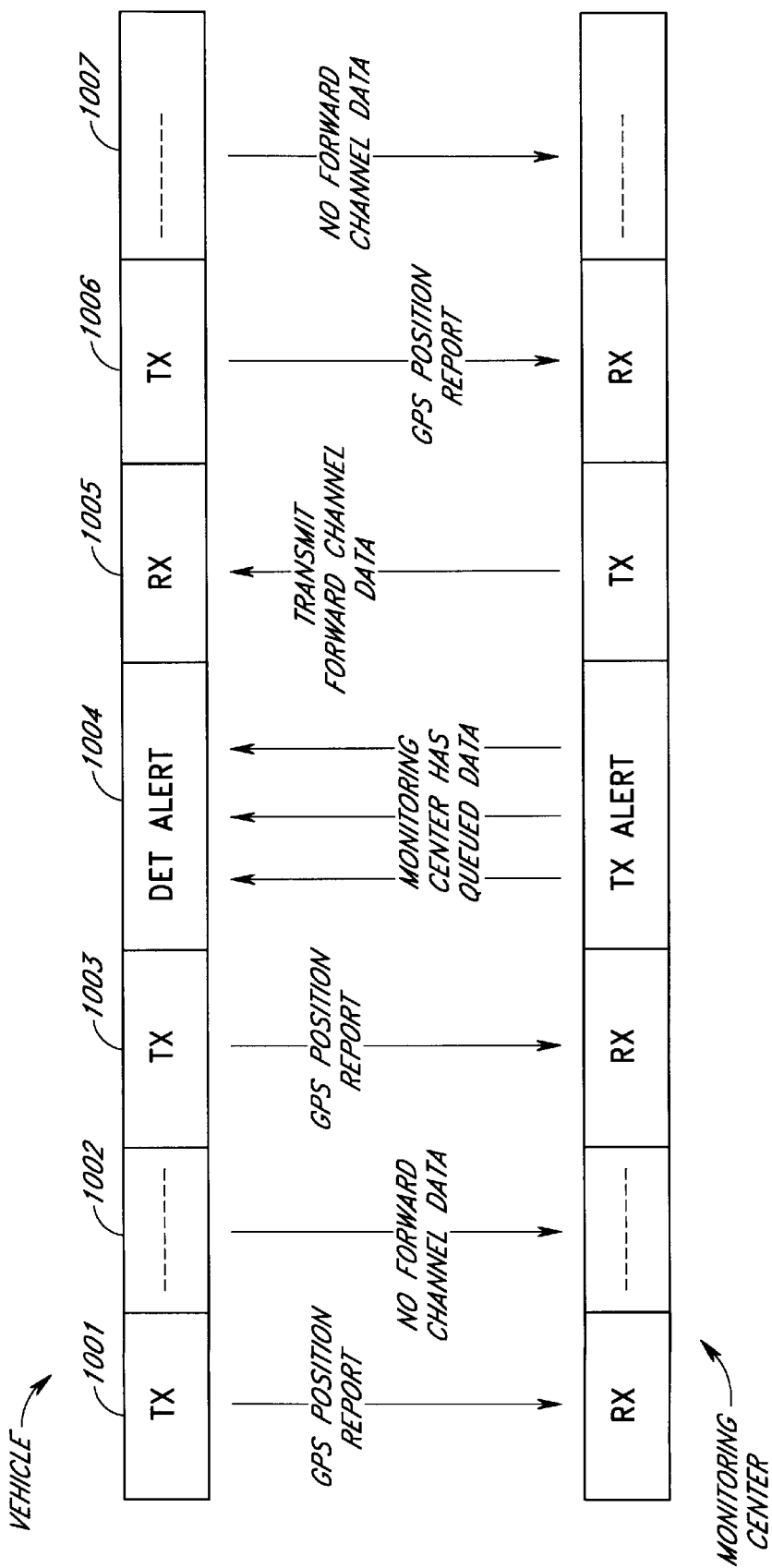
FIG. 10 is a block diagram of the transmission request monitoring loop of the present invention.

FIG. 10 illustrates the basic operation of the transmission request detector of the present invention. FIG. 10 shows a series of sequential time intervals 1001–1007. During a mobile transmission time interval 1001, the mobile unit 20 transmits, and the monitoring station 12 receives data from the vehicle (e.g. a GPS position report). Immediately following the mobile transmission time interval 1001 is a mobile listening time interval 1002. During the mobile listening time interval 1002, no data is transmitted by the mobile unit 20, and the mobile unit 20 goes into a listening (receiving) mode. Immediately following the mobile listening time interval 1002 is a mobile transmission time interval 1003. If no data is received by the mobile unit 20 during the mobile listening time interval 1002, then the mobile unit transmits another GPS position report (or other data) during the time interval 1003. This process of transmitting, followed by listening is repeated by the mobile unit 20 until, during a listening time interval 1004, while the mobile unit 20 is again in a receiving mode, the monitoring station 12 sends a transmit request message. The transmit request message causes the mobile unit 20 to remain in the listening mode during the subsequent time interval 1005 while the monitoring station 12 transmits data to the mobile unit 20. Once the monitoring station 12 has finished it's transmission, then the mobile unit 20 resumes it's normal sequence of transmitting followed by listening operations in the subsequent time intervals.

Thus for data transmission the network is full duplex in the large sense (because data can be transmitted in both directions) but not in the small sense (because only one side can transmit at any one time). For voice communication the system is full duplex since communication between the monitoring center 12 and the occupant of the vehicle 10 may occur simultaneously. The monitoring station is slaved to the mobile unit 20. The monitoring station 12 can only send a transmit request message immediately after the mobile unit 20 has sent a message. Thus, the mobile unit must send messages to the monitoring station on a regular basis. Under normal operating conditions, the mobile unit will send new data approximately once every 1.8 seconds. When the mobile unit does not have any information to send (e.g. because the GPS receiver is malfunctioning or the vehicle 10 is in a tunnel) then it must send fill packets. The fill packets contain no useful data (e.g. the data in a fill packet could be all zeroes). The data in a fill packet is ignored by the monitoring station 12, but receipt of a fill packet keeps the mobile unit 20 and the monitoring station 12 in synchronization and aid in maintaining the communication channel.

Data packets sent by the mobile unit 20 or the monitoring station can be of varying length as discussed in the previous section. In a preferred embodiment, the mobile transmitting time intervals (e.g. 1001, 1003) are approximately 1.8 seconds in length, the mobile listening time intervals (e.g. 1002) are 200 to 300 milliseconds in length. Also in the preferred embodiment, the transmission request message sent by the monitoring station 12 is simply 200 to 300 milliseconds of unmodulated data carrier (a 2500 Hz sine wave).

Other Embodiments

Although the preferred embodiment of the present invention adopts digital signal processing technology, other means are available for filtering and combining the voice signal with the data signal. A DSP is advantageously chosen because DSP's provide numerous and more accurate filtering capabilities. The DSP 95, 110 of the present invention performs the equivalent to 12th order filtering on the voice signal.

In another embodiment, the system provides for cellular calling means built into the mobile unit. This embodiment provides a system for the user to contact the monitoring station by actuating a button or hidden silent emergency button.

The preferred embodiment provides for the present invention to integrate with an automobile 10, however, vehicles besides an automobile can be embodied using the invention taught herein. For example, the mobile unit of the present invention could provide for communication and tracking of individuals, bikers, dog-sleds, boats, ships, planes, balloons, or spacecraft.

In a different embodiment the monitoring center 12 could be mobile, either on an automobile, truck, boat, plane, train, helicopter, or space craft, wherein the monitoring center receives the call via a cellular telephone or radio link and responds accordingly.

In yet another embodiment, the mobile unit 20 is configured to be a portable unit, preferably in a handheld unit. Advantageously, configuring the system as portable unit provides for an individual to carry the mobile unit 20 either in their hand or on their body. A portable embodiment of the present invention allows an individual to simultaneously transmit voice communication and location data to a monitoring center 12. A portable unit is especially advantageous for to locate individuals needing emergency police or medical assistance, or directions when lost. Such a system could also be used in conjunction with a vehicle based system to assist an individual in finding their vehicle. In addition, pseudo satellites, which provide GPS signals to areas not otherwise exposed to GPS signals, further enhance the operation of a portable embodiment of the present invention.

It will be understood that the above described arrangements of apparatus and the method therefrom are merely illustrative of applications of the preferred embodiment and it is not intended to limit the scope of the invention to the particular forms set forth, but on the contrary, it is intended to cover such alternatives, modifications and equivalents as may be included within the spirit and scope of the invention as defined by the claims.

What is claimed is:

1. A vehicle tracking and security system having simultaneous voice and data communication with a remote monitoring center comprising:
   a microphone within said vehicle producing a voice signal,
   a global positioning system (GPS) receiver within said vehicle producing location data corresponding to the location of said vehicle,
   a filter coupled to said microphone for deleting a narrow band of voice frequencies,
   a first signal processor coupled to said filter and to said GPS receiver for combining said location data with said voice signal within said narrow band of deleted voice frequencies,
   a cellular radio transmitter coupled to said combined voice and data signal for transmitting simultaneously said voice and data signals from said vehicle through a conventional cellular and telephone network to said remote monitoring center,
   a second signal processor at said remote monitoring center for separating said voice and said location data signals,
   a telephone coupled to said second signal processor to provide voice communication between said remote monitoring center and said vehicle, and
   a computer and display coupled to said second signal processor to provide a map display of the position of said vehicle derived from said location data signals.

2. The vehicle tracking and security system of claim 1, wherein said cellular radio transmits and receives data.

3. The vehicle tracking and security system of claim 1, wherein said first signal processor and second signal processor comprise digital signal processors.

4. The vehicle tracking and security system of claim 3, wherein said digital signal processor comprises a TMS320C25 digital signal processor.

5. A system for tracking vehicles comprising:
   a mobile unit having:
      a global positioning system receiver for obtaining global positioning system signals;
      a microphone for obtaining a voice signal;
      a mobile signal processor electrically connected to said global positioning system receiver and said microphone, said mobile signal processor combining the global positioning system signal within the spectrum of the voice signal to create a combined signal for transmission such that the audibility of the voice signal when said global positioning system signal is removed is not substantially affected;
      a cellular communication device connected to said mobile signal processor for transmitting said combined signal over a communication network; and,
   a monitoring center for receiving said combined signal, said monitoring center comprising:
      a monitoring center signal processor for separating said global positioning system signal and said voice signal;
      a telephone for receiving said voice signal from said monitoring center signal processor; and,
      a computer for receiving said global positioning system data, said computer having digitized maps and a display device to display said maps and the location of the mobile unit thereon.

6. The system of claim 5, wherein said combined signal comprises said voice signal having a small portion of said voice signal replaced by said global positioning system data.

7. The system of claim 5, wherein said mobile signal processor and said cellular communication device process and transmit said combined signal payload first followed by synchronization information.

8. A vehicle tracking and security system having simultaneous voice and data communication with a remote monitoring center comprising:
   a microphone within said vehicle producing a voice signal,
   a global positioning system (GPS) receiver within said vehicle obtaining location data corresponding to the location of said vehicle,
   a first signal processor coupled to said microphone and said GPS receiver, said signal processors deleting a narrow band of voice frequencies from said voice signal and combining said location data with said voice signal where said narrow band of voice frequency was deleted,
   a microprocessor coupled to said GPS receiver and said first signal processor which places the system in sleep mode to conserve power and at determinable times energizes said GPS receiver and said first signal processor,
   a cellular radio transmitter coupled to said combined voice and location data signal for transmitting simultaneously said combined voice and location data signals from said vehicle through a conventional cellular and telephone network to said remote monitoring center,
   a second signal processor at said remote monitoring center for separating said voice and said location data signals, a telephone coupled to said second signal processor to provide voice communication between said remote monitoring center and said vehicle, and a computer and display coupled to said second signal processor to provide a map display of the position of said vehicle derived from said location data signals.

9. The vehicle tracking and security system of claim 8, wherein said sleep mode comprises a state of low power usage wherein said GPS receiver, said first signal processor and said cellular radio transmitter do not consume power.

10. The vehicle tracking and security system of claim 8, wherein said microprocessor which places the system in sleep mode to conserve power comprises a PIC microprocessor.

11. A vehicle tracking and security system having simultaneous voice and data communication with a remote monitoring center comprising:

a microphone within said vehicle producing a voice signal, a global positioning system (GPS) receiver within said vehicle producing location data corresponding to the location of said vehicle, a filter coupled to said microphone for deleting a narrow band of voice frequencies, a first signal processor coupled to said filter and to said GPS receiver for combining said location data with said voice signal within said narrow band of deleted voice frequencies, a cellular radio transmitter coupled to said combined voice and data signal for transmitting simultaneously said voice and data signals from said vehicle through a conventional cellular and telephone network to said remote monitoring center, a silent assistance request sensor linked to said cellular radio transmitter to automatically call said remote monitoring center when actuated, a second signal processor at said remote monitoring center for separating said voice and said location data signals, a telephone coupled to said second signal processor to provide voice communication between said remote monitoring center and said vehicle, and a computer and display coupled to said second signal processor to provide a map display of the position of said vehicle derived from said location data signals.

12. The vehicle tracking and security system of claim 11, wherein said silent assistance request sensor comprises an activatable signaling device which causes said cellular radio transmitter to establish a communication link between said vehicle and said monitoring center.

13. The vehicle tracking and security system of claim 11, wherein said silent assistance request sensor comprises an under the carpet button.

14. A voice and data communication system comprising:
a mobile unit having:
a receiver which obtains location data signals;
a microphone for receiving a voice signal;
a signal processor receiving and processing said location data signals and said voice signal;
a communication device connected to said signal processor, said communication device configured to transmit said processed location data signals and said voice signal without interrupting or substantially degrading said voice signal; and a monitoring center located remote from said mobile unit, said monitoring center receiving and separating said processed location data signals from said voice signal.

15. The communication and location determining system of claim 14, wherein said mobile unit is portable.

16. The communication and location determining system of claim 14, wherein said mobile unit is handheld.

\* \* \* \* \*